(12) United States Patent
Farago et al.

(10) Patent No.: US 7,159,027 B2
(45) Date of Patent: Jan. 2, 2007

(54) METHOD AND DEVICE FOR COMMUNICATING DATA WITHIN A NETWORK BY COMBINING DIFFERENT COMMUNICATION APPROACHES

(75) Inventors: Andras Farago, Richardson, TX (US); Violet R. Syrotiuk, Plano, TX (US)

(73) Assignee: The University of Texas System Board of Regents, Austin, TX (US)

( * ) Notice: Subject to any disclaimer, the term of this patent is extended or adjusted under 35 U.S.C. 154(b) by 1070 days.

(21) Appl. No.: 09/999,434

(22) Filed: Nov. 14, 2001

(65) Prior Publication Data

US 2002/0099674 A1    Jul. 25, 2002

Related U.S. Application Data

(60) Provisional application No. 60/248,261, filed on Nov. 14, 2000.

(51) Int. Cl.
*G06F 15/16* (2006.01)

(52) U.S. Cl. ...................................................... 709/230

(58) Field of Classification Search ................ 709/204, 709/227; 370/232–237
See application file for complete search history.

(56) References Cited

U.S. PATENT DOCUMENTS

| | | | | |
|---|---|---|---|---|
| 5,063,601 A * | 11/1991 | Hayduk | ........................ | 706/39 |
| 6,338,046 B1 * | 1/2002 | Saari et al. | .................... | 705/34 |
| 6,430,155 B1 * | 8/2002 | Davie et al. | ................. | 370/232 |
| 6,604,141 B1 * | 8/2003 | Ventura | ........................ | 709/227 |
| 6,831,895 B1 * | 12/2004 | Ji et al. | ........................ | 370/237 |

OTHER PUBLICATIONS

Andras Farago, Andrew Myers, Violet Syrotiuk, Gergely Zaruba;"Meta-MAC Protocols: Automatic Combination of MAC Protocols to Optimize Performance for Unknown Conditions";IEEE Jourbal on selected areas in communications, vol. 18, No. 9; Sep. 2000;pp. 1670-1681.*
Papadimitriou, et al.; "Self-adaptive random-access protocols for WDM passive star networks": *IEEE Proc.-Comput.Digit.Tech*; vol. 142, No. 4, Jul. 1995; pp. 306-312.
Papadimitriou, et al.; "Learning Automata-Based Receiver Conflict Avoidance Algorithms for WDM Broadcast-and-Select Star Networks"; *IEEE/ACM Transactions on Networking*, vol. 4, No. 3, Jul. 1996; pp. 407-412.

* cited by examiner

*Primary Examiner*—Jason Cardone
*Assistant Examiner*—Minh-Chau N. Nguyen
(74) *Attorney, Agent, or Firm*—Jenkens & Gilchrist, P.C.

(57) ABSTRACT

A method and device are disclosed for optimizing use of a plurality of different approaches to communicating data. The device includes a plurality of different components, each component capable of being utilized by the device in communicating data with other devices in the network. Each component generates, when an opportunity for communicating data occurs, a decision relating to the communication using a distinct rule set. A decision handler, coupled to the components, generates a final decision relating to the communication of data based upon each decision generated by the components and upon the correctness of prior decisions generated by the components. The correctness of the final decision is used subsequently in generating additional final decisions.

35 Claims, 2 Drawing Sheets

METHOD AND DEVICE FOR COMMUNICATING DATA WITHIN A NETWORK BY COMBINING DIFFERENT COMMUNICATION APPROACHES

CROSS REFERENCE TO RELATED APPLICATION

The present invention is related to and claims priority from U.S. patent application Ser. No. 60/248,261, filed Nov. 14, 2000. The above-identified patent application is hereby incorporated by reference in its entirety.

BACKGROUND OF THE INVENTION

1. Technical Field of the Invention

The present invention relates to communicating data in a network, such as a computer network or a telecommunications network, and particularly to a method and device for substantially optimizing data communication by dynamically combining communication-related decisions generated by a set of components in a device in the network.

2. Description of the Related Art

An ever-increasing number of users of electronic devices, such as computers, personal design assistants and cellular telephones, has dramatically increased the amount of data that is communicated in existing communications networks. The term "data" will be referred to hereinafter to mean any type of information that is capable of being transported over a network, including voice, video or control information, whether in encrypted form or otherwise. The increased network traffic has placed a premium on more efficiently communicating data. Several approaches presently exist in attempting to improve network communication.

For example, in a multiaccess network, the multiaccess medium is a shared resource. Medium access control (MAC) protocols coordinate packet transmissions in a multiaccess network. There are a number of instances wherein MAC protocols are combined together to enhance adaptability and performance to changes in network conditions.

One well known technique using protocol parameter adjustment is the class of backoff algorithms used by contention protocols. Two characteristic backoff solutions are the pseudo-Bayesian algorithm and the binary exponential backoff.

The pseudo-Bayesian algorithm dynamically manipulates the transmission probability of each node by maintaining an estimate of the number of backlogged nodes, i.e., nodes with packets to send. An increase in the number of back-logged nodes reduces the transmission probability, and vice versa. However, each node must have an accurate estimate of the overall arrival rate of incoming traffic which is generally unknown and time varying. Each node must also know the outcome of every network transmission which may not be possible in every type of multiaccess network.

In a network utilizing the binary exponential backoff algorithm, each node adjusts its transmission probability based upon the number of unsuccessful transmission attempts. However, the exponential backoff was proven unstable (infinitely growing delays) under quite general modeling assumptions.

Another technique is the family of spatial reuse TDMA protocols used in mobile multi-hop networks. A level of adaptability can be achieved by dynamically recomputing transmission schedules based upon the local network topology. Some adaptability is accomplished by nodes alternating between a contention protocol (to determine the proper schedule length and slot assignments) and a TDMA allocation protocol. However, when node mobility results in a topology change, the contention protocol must be run again. The spatial reuse TDMA protocols can become unstable if the rate of mobility outpaces the rate at which the transmission schedules can be updated (using the contention protocol). In addition, scarce bandwidth resources are lost to the contention protocol.

Based upon the foregoing, there is a need for more effectively utilizing communication techniques so as to reduce network traffic and generally make network communication more efficient.

SUMMARY OF THE INVENTION

Embodiments of the present invention overcome shortcomings in prior systems and satisfy a significant need for a technique for better optimizing communication between devices in a computer-based and/or communications network. The embodiments of the present invention utilize existing communication techniques and make final decisions relating to the communication of data from a network device based in part upon the correctness of decisions by the existing techniques in previously communicating data.

In particular, an exemplary embodiment of the present invention is directed to a device in a network in which data is communicated. The device includes a plurality of different communication-related components or approaches, such as different data communication protocols. Each is capable of being utilized by the device in communicating data with other devices in the network. Each component generates, when an opportunity for communicating data occurs, a decision relating to the communication thereof. A decision handler in the device is coupled to the components and generates a final decision relating to the communication of the data based upon each decision generated by the components and upon the correctness of prior decisions generated by the components.

The decision handler may determine the final decision by applying weight factors to each decision, whereby the value of each weight factor is based upon the correctness of prior decisions by the corresponding component. The final decision, for example, may be computed by the decision handler as a weighted average of the decisions, whereby a distinct weight factor is applied to each decision generated by the components. The decision handler may update the weight factors following learning of the outcome (correctness) of each final decision computed. In this way, the exemplary embodiment of the present invention is able to substantially optimally utilize known data communication techniques without knowing in advance the particular data communication approach that best matches potentially changing and oftentimes unpredictable network conditions.

According to another exemplary embodiment of the present invention, a method of communicating data includes computing a plurality of different decisions relating to the communication of a first unit of data. A final decision may be then computed as a function of the decisions and the weight factors applied thereto. The final decision, for example, may be the weighted average of the decisions. Next, a communication operation is selectively performed based upon the final decision. The correctness of the final decision may then be determined and the weight factors updated based upon the correctness of the final decision. The updated weight factors are subsequently available for use in determining a final decision relating to communicating other data within the network.

Instead of combining a set of different communication protocols in a substantially optimized manner, other embodiments of the present invention may combine, in a substantially optimized manner, the same communication protocol having different parameter values of critical protocol parameters.

The present invention may be used to make decisions relating to a wide variety of functions relating to communicating data within a network. For instance, the present invention may be used to make network management decisions, decisions concerning whether or not to transmit data at certain times, decisions concerning queuing policies within a network, decisions for routing data within the network and decisions concerning transmission power levels for transmitting data within the network.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE EXEMPLARY EMBODIMENTS

The present invention will now be described more fully hereinafter with reference to the accompanying drawings in which exemplary embodiments of the present invention are shown. This invention may, however, be embodied in many different forms and should not be construed as being limited to the exemplary embodiments set forth herein. Rather, the embodiments are provided so that this disclosure will be thorough and complete, and will fully convey the scope of the invention to those skilled in the art.

Figure 1:
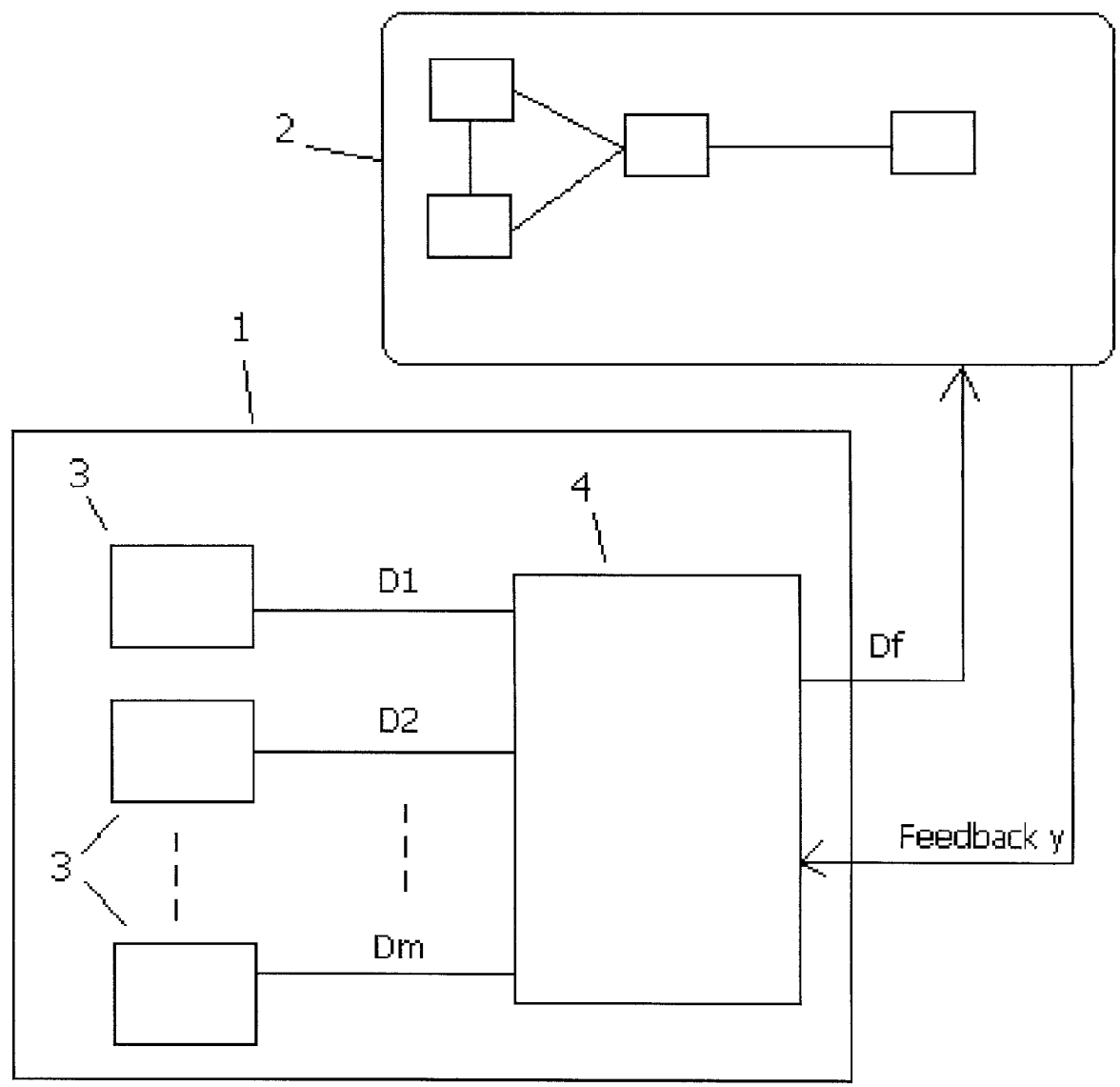
FIG. 1 is a block diagram of a device in a network in which data is communicated, according to an exemplary embodiment of the present invention.

Referring to FIG. 1, there is shown a device 1 in a network 2 in which data is communicated according to an exemplary embodiment of the present invention. Network 2 may be virtually any type of network having changing, unknown or partially known network conditions, such as a mobile network, a network carrying multimedia or quality-of-service sensitive data, a broadcast/multiaccess channel network, and a traditional wired network. Device 1 may be any of a number of different devices capable of communicating (i.e., sending and receiving) data, such as a computer or a mobile telephone. In general terms, device 1 is capable of combining a number of different approaches for communicating data within network 2 and utilizing local feedback to dynamically and automatically adapt to changing network conditions and thereby substantially optimize communication-related decisions generated according to the different communication approaches.

In particular, device 1 includes a plurality of communication components 3. Each component 3 makes decisions related to communicating data between device 1 and other devices in network 2 according to a rule set that is different from the rule set utilized by other components 3. For example, in an exemplary embodiment of the present invention, each component 3 may be or utilize a distinct communication protocol for communicating data between device 1 and other devices in the network 2. In this context, one component 3 may be or utilize a TDMA protocol and another component 3 may be or utilize a slotted Aloha protocol. In another exemplary embodiment of the present invention, components 3 may utilize the same communication protocol, with each component 3 utilizing a set of one or more distinct protocol parameter values. In this context, components 3 may, for example, utilize a TDMA protocol, with the TDMA protocol for each component 3 having a distinct frame length. Components 3 may alternatively utilize a p-persistent Aloha protocol, with each component 3 having a different value for p. Each decision generated by components 3 may have any of a number of possible values. For instance, a decision generated by a component 3 may be a binary decision having one of two possible values, with each possible value indicating a different action or inaction to be taken.

In addition, components 3 may make decisions directed to other aspects of communicating data between device 1 and other devices in network 2. According to other embodiments of the present invention, components 3 may make network management decisions or establish network queuing policies. In yet another embodiment of the present invention, device 1 may be a router and components 3 may make routing decisions to devices in network 2. In another alternative embodiment, device 1 may transmit data over the air interface and components 3 may decide the power level for transmitting data using a number of different transmission power approaches. As can be seen, components 3 may make decisions relating to virtually any aspect of data communication between device 1 and other devices in network 2.

Device 1 may further include a decision handler 4 which receives decisions from components 3 and makes a final decision relating to data communication based upon the decisions provided by components 3. Decision handler 4 may compute final decisions based upon local network feedback. Because decision handler 4 only utilizes local network feedback information, centralized control or an exchange of messages across network 2 is not needed in order for decision handler 4 to compute the final decisions. Consequently, there is no increase in traffic over network 2.

According to an exemplary embodiment of the present invention, decision handler 4 may generate a final decision from decisions generated by components 3 by scaling each of the decisions based upon the correctness of prior decisions by the corresponding component 3. Decision handler 4 may combine the scaled decisions in computing a final decision.

For example, decision handler 4 may combine the decisions generated by components 3 by computing a weighted average of the decisions. A distinct weight factor may be applied to each decision. With device having M components 3, the equation for computing the weighted average $D_t$ of the decisions by components 3 may be $$D_t = F\left(\frac{\sum_{i=1}^{M} w_i D_i}{\sum_{i=1}^{M} w_i}\right)$$

wherein, $D_I$ represents a decision by a component 3, $w_I$ represents the weight factor applied to decision $D_I$, and $F(x)$ is any of a plurality of functions. Function $F(x)$ may be equal to x. Alternatively, $F(x)$ is a step function which rounds $D_t$ to zero or one depending upon whether the weighted average $D_t$ is below or above 0.5. To most optimally compute final decisions, function $F(x)$ may grow linearly from zero to one in an interval $[(½)-c*(½)+c]$ and is truncated to zero and one before and after the interval, respectively. In this way, function $F(x)$ may be described by the equation $$F(x) = \begin{cases} 0, & \text{if } x < 1/2 - c \\ 1/(2*c)*(x-1/2+c), & \text{if } 1/2-c \le x \le 1/2+c \\ 1, & \text{if } x > 1/2+c \end{cases}$$

The parameter c depends upon another parameter $\eta$ that is greater than zero and controls updating of the weight factors. For example, c may be represented by the equation $$c = ½ * [(1+e^{-\eta})/(1-e^{-\eta})] * ln[2/(1+e^{-\eta})] * y$$

Using the function $F(x)$ and weight factors $w_i$, the weighted average $D_t$ of the decisions by components 3 may be computed by decision handler 4.

Alternatively, decision handler 4 may apply weight factors to the decisions other than by computing a weighted average thereof. It is understood that any of a wide variety of functions may be utilized. For instance, the decisions of certain components 3 may not be considered in rendering some final decisions.

Decision handler 4 may be capable of rounding the weighted average $D_t$ to arrive at the appropriate final decision. For instance, for a binary final decision, decision handler 4 may round the weighted average $D_t$ to either of two possible values so that the final decision $D_f$ generated by decision handler 4 is a binary outcome. In this way, the final decision indicates one of two possible actions to be taken. In accordance with an exemplary embodiment of the present invention, decision handler 4 randomly rounds the weighted average $D_t$ to obtain the final decision $D_f$. The random rounding may be probabilistically represented by $\Pr(D_f=1)=D_t$ and $\Pr(D_f=0)=1-D_t$, wherein $\Pr(x)$ represents the probability of event x occurring. Upon the final decision $D_f$ being computed by decision handler 4, device 1 selectively performs an activity (or refrains from performing an activity, depending upon the final decision) in response.

As stated above, decision handler 4 computes the final decision $D_f$ from a plurality of decisions $D_i$ based in part upon local feedback information previously received by device 1. Specifically, following execution of an activity/inactivity by device 1, device 1 may utilize local feedback information and determine whether or not the final decision $D_f$ corresponding to the executed activity/inactivity was correct. The local feedback information utilized may be of the type to allow decision handler 4 to determine the value of a binary correctness feedback variable y. The value of correctness feedback variable y is a first binary value in the event the final decision $D_f$ was determined to be correct, and a second binary value in the event the final decision $D_f$ was incorrect. For instance, if the final decision made by decision handler 4 is to transmit data at a certain time, such as a predetermined TDMA time slot, a correct decision may be the successful transmission of the data and an incorrect decision is a signal collision with the transmission of other data. If the final decision is not to transmit data during a certain time slot over a certain channel and data existed in a transmission queue, a correct decision may be the certain channel being used by another device and an incorrect decision is the certain channel being idle during the certain time slot.

Correspondingly, the correctness feedback variable y is equal to binary one if the decision was correct and binary zero if the decision was incorrect. Utilizing the correctness feedback variable y, the correct decision z can be computed as $$z = D_f * y + (1-D_f)(1-y).$$

Once the correct decision z is known, decision handler 4 may update weight factors w according to the equation $$w_{i,updated} = w_i * e^{-\eta |D-z|},$$

where $w_{i,updated}$ is the updated weight factor. The term $|D_i-z|$ represents the deviation of the $i^{th}$ component 3 from the correct decision. If the deviation is zero, the weight factor $w_i$ for $i^{th}$ the component 3 remains unchanged. Otherwise if the deviation is not zero, the updated weight factor $w_i$ is decreased such that increasing deviation (i.e., errors) decreases the weight factor $w_i$. The above-described updating means, in connection with the use of normalization in computing the final decision $D_f$, that the weight factors $w_i$ corresponding to components 3 that made a correct decision will increase and the weight factors $w_i$ corresponding to components 3 that made incorrect decisions will decrease. As can be seen, weight factors $w_i$ reflect a "credit history" of the components 3.

Components 3 and decision handler 4 may be implemented, with relatively low complexity, in hardware, software or a combination thereof.

It is noted that using the above-identified equation for updating weight factors $w_i$, weight factors $w_i$ will not increase in value and may usually decrease in value. To prevent weight factors $w_i$ from becoming arbitrarily small, each weight factor $w_i$ may be occasionally increased by the same amount.

It is understood that decision handler 4 may update weight factors $w_i$ in other ways. For instance, decision handler 4 may utilize priorities in updating weight factors $w_i$. Decision handler 4 may utilize a different equation(s) to update the weight factor corresponding to an "expert" component 3, relative to the equation(s) utilized to update the weight factor corresponding to the other components 3.

Figure 2:
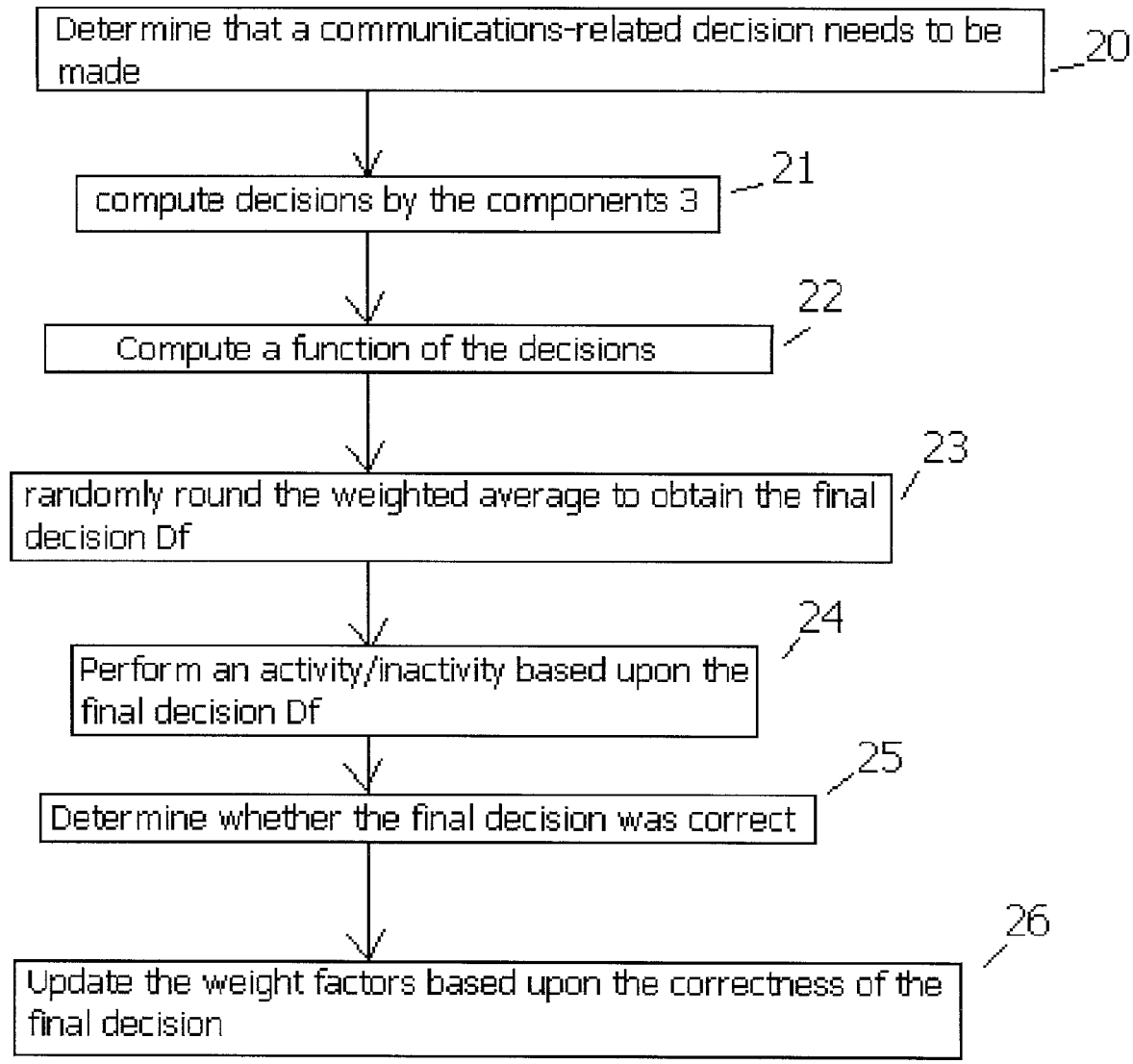
FIG. 2 is a flow chart illustrating an operation of the device of FIG. 1.

The operation of device 1 according to an exemplary embodiment will be described with reference to FIG. 2. Initially, it is determined that a decision relating to communication of data between device 1 and other devices in network 2 is to be made at 20. Each component 3 makes a decision at 21 based upon its own set of rules for communicating data. Next, decision handler 4 may combine the decisions using weight factors $w_i$ to arrive at a final decision. For example, decision handler 4 may compute the weighted average $D_t$ of the decisions at 22, using weight factors $w_i$. Next, the weighted average $D_t$ may be randomly rounded at step 23 to obtain the final decision $D_f$. Based upon the value of the final decision $D_f$, device 1 performs or refrains from performing an activity at 24. The activity relates to the decisions made by components 3, such as whether or not to transmit data at a certain time, or which of a number of different power levels to use in transmitting data. Following the execution/absence of the activity, device 1 may determine at 25 whether the executed activity was a correct decision. Whether or not a correct decision was made may be determined by calculating the correct decision z. Next, the weight factors $w_i$ are updated at 26 based upon the correct decision z. The updated weight factors $w_i$ may be stored for future use. Thereafter, when another decision relating to the communication of data between device 1 and other devices in network 2 needs to be made, steps 21–26 are repeated using the updated weight factors $w_{i,\ updated}$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of communicating data by a device in a network of devices, comprising:
   computing a plurality of different decisions relating to the communication of a first unit of data, each decision being based upon a different rule set for communicating data;
   computing a final decision as a function of the plurality of decisions and a plurality of weight factors, each weight factor corresponding to a distinct decision;
   selectively performing a communication operation based upon the final decision;
   determining the correctness of the final decision;
   updating the weight factors based upon the correctness of the final decision;
   wherein computing the final decision comprises computing a weighted sum of the decisions, each decision having a different weight factor applied thereto; and
   wherein communicating the first unit of data is performed over a physical channel.

2. The method of claim 1 wherein the step of computing a final decision comprises computing a weighted average of the decisions, the weighted average $D_t$ is computed according to the equation $$D_t = F\left(\frac{\sum_{i=1}^{M} w_i D_i}{\sum_{i=1}^{M} w_i}\right)$$

where $w_i$ is a weight factor, $D_i$ is a decision according to one of a different communication protocol and different parameter value of a communication protocol, and F is a function.

3. The method of claim 2, wherein the function F is a step function.

4. The method of claim 3, wherein each weight factor $w_i$ is updated during the step of updating according to the equation $$w_{i,updated} = w_i * e^{+\eta|D_i - z|},$$

where $D_i$ is a decision corresponding to weight $w_i$ and $\eta$ is a parameter having a value greater than zero.

5. The method of claim 2, wherein the function F is a function according to the equation $$F(x) = \begin{cases} 0, & \text{if } x < 1/2 - c \\ 1/(2*c)*(x - 1/2 + c), & \text{if } 1/2 - c \le x \le 1/2 + c \\ 1, & \text{if } x > 1/2 + c \end{cases}$$

where c is a parameter.

6. The method of claim 1, wherein the final decision is computed by the device without additional communication of information over the network.

7. The method of claim 1, wherein the step of determining the correctness of the decisions determines the correctness of each decision based upon local network feedback at the device.

8. The method of claim 1, wherein the step of updating comprises, for each weight factor, increasing the weight factor in the event the decision corresponding thereto was a correct decision and decreasing the weight factor in the event the decision corresponding thereto was an incorrect decision.

9. The method of claim 1, further comprising:
   repeating the steps of computing different decisions, computing a final decision, selectively performing a communication operation and determining the correctness of the decisions for communicating a second unit of data using the updated weight factors.

10. The method of claim 1, wherein:
    the step of computing a final decision comprises computing a weighted average of the decisions, and rounding the weighted average using randomization.

11. The method of claim 1, wherein the step of computing a final decision comprises computing a weighted average of the decisions, and the step of determining the correctness of the final decision determines the correctness z according to the equation $$z = D_f * y + (1 - D_f)(1 - y),$$

wherein $D_f$ is the final decision and y is one if the final decision was correct and zero if the final decision was incorrect.

12. The method of claim 1, wherein the final decision decides whether to transmit the first unit of data from the device, decides a transmission power level for transmitting the first unit of data from the device, or identifies another device in the network to which to send the first unit of data.

13. The method of claim 1, further comprising:
    determining a final decision relating to communicating of a second unit of data, based upon the updated weight factors.

14. A device in a network of devices wherein data is communicated between devices, comprising:
    a plurality of different components, each component being capable of being utilized by the device in communicating data with other devices in the network, each component generating, when an opportunity for communicating data occurs, a decision relating to the communication using a distinct rule set;
    a decision handler, coupled to the plurality of different components, for generating a final decision relating to the communication of data based upon each decision generated by the components and upon the correctness of prior decisions generated by the components;
    wherein the decision handler determines the correctness of the final decision and updates weight factors based upon the correctness of the final decision;
    wherein the decision handler computes the final decision based upon a weighted sum of the decisions, each decision having a different weight factor applied thereto by the decision handler; and
    wherein communicating the data is performed over a physical channel.

15. The device of claim 14, wherein the decision handler computes the final decision based upon a weighted average of the decisions, the weighted average $D_t$ is computed according to the equation $$D_t = F\left(\frac{\sum_{i=1}^{M} w_i D_1}{\sum_{i=1}^{M} w_i}\right)$$

where $w_i$ is a weight factor and $D_i$ is a decision of a component, and F is a function.

16. The device of claim 15, wherein the function F is a function according to the equation $$F(x) = \begin{array}{ll} 0, & \text{if } x < 1/2 - c \\ 1/(2*c)*(x - 1/2 + c), & \text{if } 1/2 - c \le x \le 1/2 + c \\ 1, & \text{if } x > 1/2 + c, \end{array}$$

where c is a parameter based upon a constant parameter which controls the updating of the weighted factors.

17. The device of claim 15, wherein the function F is a step function.

18. The device of claim 14, wherein the decision handler computes a weighted average of the decisions in computing the final decision, and determines the correctness z of the final decision according to the equation $$z = D_f * y + (1 - D_f)(1 - y),$$

wherein $D_f$ is the final decision and y is one if the final decision was correct and zero if the final decision was incorrect.

19. The device of claim 18, wherein each weight factor $W_i$ is updated by the decision handler according to the equation $$w_{i,updated} = w_i * e^{-\eta |Di - z|},$$

where $D_i$ is a decision corresponding to weight $w_i$ and $\eta$ is a parameter having a value greater than zero.

20. The device of claim 14, wherein each component utilizes a distinct communication protocol.

21. The device of claim 14, wherein the components are a single communication protocol utilizing a protocol parameter, the protocol parameter for each component being a distinct value.

22. The device of claim 14, wherein each weight factor is based upon the correctness of prior decisions by the corresponding component.

23. The device of claim 14, wherein the device selectively performs a communication operation based upon the final decision.

24. The device of claim 14, wherein, for each weight factor, the decision handler increases the weight factor in the event the decision corresponding thereto was a correct decision and decreases the weight factor in the event the decision corresponding thereto was an incorrect decision.

25. The device of claim 14, wherein:
the device subsequently utilizes the updated weight factors in computing a final decision relating to communication of other data.

26. The device of claim 14, wherein:
the decision handler computes a weighted average of the decisions, and rounds the weighted average using randomization to obtain the final decision.

27. The device of claim 14, wherein the final decision is computed by the device without additional communication of information over the network.

28. The device of claim 14, wherein the decision handler determines the correctness of each decision based upon local network feedback at the device.

29. The device of claim 14, wherein the final decision decides whether to transmit data from the device, decides a transmission power level for transmitting data from the device, or identifies another device in the network to which to send the first unit of data.

30. A method of communicating data within a network of devices, comprising:
determining, at a device, a plurality of decisions relating to communicating a unit of information, each decision utilizing a distinct set of rules for communicating information;
determining, at the device, a final decision relating to the communication of the unit of information based upon the plurality of decisions and upon the correctness of prior decisions generated according to each set of rules for communicating information;
selectively performing a communication operation based upon the final decision;
updating a weight factor for each set of rules based upon the correctness determined;
wherein the step of determining the final decision comprises determining a weighted average of the decisions, each decision having a different weight factor applied thereto; and
wherein communicating the unit of information is performed over a physical channel.

31. The method of claim 30, wherein each weight factor corresponding to a distinct set of rules and having a value based upon the correctness of prior decisions determined according to the corresponding set of rules.

32. The method of claim 31, further comprising:
following the step of selectively performing a communication operation, determining the correctness of the final decision.

33. The method of claim 30, wherein each set of rules corresponds to a distinct communications protocol.

34. The method of claim 30, wherein the distinct set of rules correspond to a single communications protocol, and each set of rules utilizes a distinct protocol parameter.

35. The method of claim 30, wherein the step of determining the final decision includes rounding the weighted average using randomization.

* * * * *